(12) United States Patent
Poggio et al.

(10) Patent No.: US 6,421,463 B1
(45) Date of Patent: Jul. 16, 2002

(54) TRAINABLE SYSTEM TO SEARCH FOR OBJECTS IN IMAGES

(75) Inventors: Tomaso Poggio, Wellesley, MA (US); Michael Oren, New York, NY (US); Constatine P. Papageorgiou, Boston, MA (US); Pawan Sinha, Madison, WI (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/282,742

(22) Filed: Mar. 31, 1999

Related U.S. Application Data
(60) Provisional application No. 60/080,358, filed on Apr. 1, 1998.

(51) Int. Cl.$^7$ .............................. G06K 9/62; G06K 9/64
(52) U.S. Cl. ......................................... 382/224; 382/279
(58) Field of Search .................................. 382/128, 132, 382/224, 209, 217, 218, 279, 190, 195; 375/240.11

(56) References Cited

U.S. PATENT DOCUMENTS

| | | | |
|---|---|---|---|
| 5,325,475 A | 6/1994 | Poggio et al. ............... | 345/433 |
| 5,412,738 A | 5/1995 | Brunelli ....................... | 382/115 |
| 5,598,488 A | 1/1997 | Poggio et al. ............... | 382/278 |
| 5,642,431 A | 6/1997 | Poggio et al. ............... | 382/118 |
| 5,659,692 A | 8/1997 | Poggio et al. ............... | 345/330 |
| 5,841,473 A * | 11/1998 | Chui et al. .................. | 348/390 |
| 5,870,502 A * | 2/1999 | Bonneau et al. ............ | 382/249 |
| 6,081,612 A * | 6/2000 | Gutkowicz-Krusin et al. ................ | 382/128 |
| 6,148,106 A * | 11/2000 | Impagliazzo ................ | 382/224 |
| 6,173,068 B1 * | 1/2001 | Prokoski ..................... | 382/115 |

OTHER PUBLICATIONS

Tolig et al, "Wavelet Neural Network for Classification of transient signals", Sep. 1997; IEEE Paper ISBN: 0–7803–4173–2, pp. 161–166.*

Vrhel et al, "Rapid Computation of the Continuous Wavelet Transform by Oblique Projections", Apr. 1997; IEEE Paper, vol. 45, Issue 4, pp. 891–900.*

(List continued on next page.)

*Primary Examiner*—Joseph Mancuso
*Assistant Examiner*—Mehrdad Dastouri
(74) *Attorney, Agent, or Firm*—Daly, Crowley & Mofford, LLP

(57) ABSTRACT

A trainable object detection system and technique for detecting objects such as people in static or video images of cluttered scenes is described. The described system and technique can be used to detect highly non-rigid objects with a high degree of variability in size, shape, color, and texture. The system learns from examples and does not rely on any a priori (hand-crafted) models or on motion. The technique utilizes a wavelet template that defines the shape of an object in terms of a subset of the wavelet coefficients of the image. It is invariant to changes in color and texture and can be used to robustly define a rich and complex class of objects such as people. The invariant properties and computational efficiency of the wavelet template make it an effective tool for object detection.

14 Claims, 13 Drawing Sheets-

OTHER PUBLICATIONS

Gorter et al, "Hierarchical and Variational Geometric Modeling with Wavelets", Apr. 1995; ACM Paper ISBN: 0-89791-736-7, pp. 35-42/205.*

N.R. Adam and A. Gangopadhyay. Content Bases Retrieval in Digital Libraries. In IEEE *Computer Magazine*, pp. 93-95.

B. Boser, I. Guyon, and V. Vapnik. A training algorithm for optimum margin classifier. In *Proceedings of the Fifth Annual ACM Workshop on Computational Learning Theory*, pp. 144-152. ACM, 1992.

H.-J. Chen and Y. Shirai. Detecting multiple image motions by exploiting temporal coherence of apparent motions. *Computer Vision and Pattern Recognition*, pp. 899-902, 1994.

R. F. Edgar Osuna and F. Girosi. Support vector machines: Training and applications. MIT CBCL-Memo, Mar. 1997.

C.P. Papageorgiou, M. Oren and T. Poggio. A General Framework for Object Detection. *Computer Vision and Pattern Recognition*. 1998.

C. Jacobs, A. Finkelstein, and D. Salesin. Fast multiresolution image querying. *SIGGRAPH$_{95}$*, Aug. 1994. University of Washington, TR-95-01-06.

M. Leung and Y.H. Yang. Human body motion segmentation in a complex case. *Pattern Recognition*, 20(1):55-64, 1987.

M. Leung and Y.H. Yang. A region based approach for human body analysis. *Pattern Recognition*, 20(3):321-39, 1987.

S. Mallat. A theory for multiresolution signal decomposition: The wavelet representation. *IEEE Transactions on Pattern Analysis and Machine Intelligence*, 11(7):674-93, Jul. 1989.

B. Moghaddam and A. Pentland. Probabilistic visual learning for object detection. Technical Report 326, Media Laboratory, Massachusetts Institute of Technology, 1995.

M. Oren, C. Papageorgiou, P. Sinha, E. Osuna, and T. Poggio. Pedestrain detection using wavelet templates. In *Computer Vision and Pattern Recognition*, pp. 193-199, 1997.

K. Rohr. Incremental recognition of pedestrians from image sequences. *Computer Vision and Pattern Recognition*, pp. 8-13, 1993.

H. Rowley, S. Baluja, and T. Kanade. Human face detection in visual scenes. Technical Report CMU-CS-95-158, School of Computer Science, Carnegie Mellon University, Jul./Nov. 1995.

E. Stollnitz, T. DeRose, and D. Salesin. Wavelets for computer graphics: A primer. University of Washington, TR-94-09-11, Sep. 1994, pp. 1-40.

K.-K. Sung and T. Poggio. Example-based learning for view-based human face detection. A.I. Memo 1521, Artificial Intelligence Laboratory, Massachusetts Institute of Technology, Dec. 1994.

T. Tsukiyama and Y. Shirai. Detection of the movements of persons from a sparse sequence of tv images. *Pattern Recognition*, 18(3/4):207-13, 1985.

R. Vaillant, C. Monrocq, and Y. L. Cun. Original approach for the localization of objects in images. *IEE Pro.-Vis. Image Signal Processing*, 141(4), Aug. 1994, pp. 245-250.

* cited by examiner

TRAINABLE SYSTEM TO SEARCH FOR OBJECTS IN IMAGES

This application claims benefit of provisional appln. No. 60/080,358 filed Apr. 1, 1998.

FIELD OF THE INVENTION

This invention relates generally to image processing systems and more particularly to systems for detecting objects in images.

BACKGROUND OF THE INVENTION

As is known in the art, an analog or continuous parameter image such as a still photograph or a frame in a video sequence may be represented as a matrix of digital values and stored in a storage device of a computer or other digital processing device. When an image is represented in this way, it is generally referred to as a digital image. It is desirable to digitize an image such that the image may be digitally processed by a processing device.

Images which illustrate items or scenes recognizable by a human typically contain at least one object such as a persons face, an entire person, a car, etc . . . Some images, referred to as "cluttered" images, contain more than one object of the same type and/or more than one type of object. In a single image or picture of a city street, for example, a number of objects such as people walking on a sidewalk, street signs, light posts, buildings and cars may all be visible within the image. Thus, an image may contain more than one type or class of object (e.g. pedestrians as one class and cars as a different class) as well as multiple instances of objects of the same type (e.g. multiple pedestrians walking on a sidewalk).

As is also known, object detection refers to the process of detecting a particular object or a particular type of object contained within an image. In the object detection process, an object class description is important since the object detection process requires a system to differentiate between a particular object class and all other possible types of objects in the rest of the world. This is in contrast to pattern classification, in which it is only necessary to decide between a relatively small number of classes.

Furthermore, in defining or modeling complicated classes of objects (e.g., faces, pedestrians, etc . . . ) the intra-class variability itself is significant and difficult to model. Since it is not known how many instances of the class are presented in any particular image or scene, if any, the detection problem cannot easily be solved using methods such as maximum-a-posteriori probability (MAP) or maximum likelihood (ML) methods. Consequently, the classification of each pattern in the image must be performed independently. This makes the decision process susceptible to missed instances of the class and to false positives. Thus, in an object detection process, it is desirable for the class description to have large discriminative power thereby enabling the processing system to recognize particular object types in a variety of different images including cluttered and uncluttered images.

One problem, therefore, with the object detection process arises due to difficulties in specifying appropriate characteristics to include in an object class. Characteristics used to specify an object class are referred to as a class description.

To help overcome the difficulties and limitations of object detection due to class descriptions, one approach to detect objects utilizes motion and explicit segmentation of the image. Such approaches have been used, for example, to detect people within an image. One problem with this approach, however, is that it is possible that an object which is of the type intended to be detected is not moving. Thus, in this case, the utilization of motion would not aid in the detection of an object.

Another approach to detecting objects in an image is to utilize trainable object detection. Such an approach has been utilized to detect faces in cluttered scenes. The face detection system utilizes models of face and non-face patterns in a high dimensional space and derives a statistical model for the a particular class such as the class of frontal human faces. Frontal human faces, despite their variability, share similar patterns (shape and the spatial layout of facial features) and their color space is relatively constrained.

Such an approach, without a flexible scheme to characterize the object class, will not be well suited to provide optimum performance unless the objects such as faces have similar patterns (shape and the spatial layout of facial features) and relatively constrained color spaces. Thus, such an approach is not well-suited to detection of those types of objects, such as pedestrians, which typically have dissimilar patterns and relatively unconstrained color spaces.

The detection of objects, such as pedestrians for example, having significant variability in the patterns and colors within the boundaries of the object can be further complicated by the absence of constraints on the image background. Given these problems, direct analysis of pixel characteristics (e.g., intensity, color and texture) is not adequate to reliably and repeatedly detect objects.

One technique, sometimes referred to as the ratio template technique, detects faces in cluttered scenes by utilizing a relatively small set of relationships between face regions. The set of relationships are collectively referred to as a ratio template and provide a constraint for face detection. The ratio template encodes the ordinal structure of the brightness distribution on an object such as a face. The ratio template consists of a set of inequality relationships between the average intensities of a few different object-regions. For example, as applied to faces, the ratio template consists of a set of inequality relationships between the average intensities of a few different face-regions.

This technique utilizes the concept that while the absolute intensity values of different regions may change dramatically under varying illumination conditions, their mutual ordinal relationships (binarized ratios) remain largely unaffected. Thus, for instance, the forehead is typically brighter than the eye-socket regions for all but the most contrived lighting setups.

The ratio template technique overcomes some but not all of the problems associated with detecting objects having significant variability in the patterns and colors within the boundaries of the object and with detection of such objects in the absence of constraints on the image background.

Nevertheless, it would be desirable to provide a technique to reliably and repeatedly detect objects, such as pedestrians, which have significant variability in patterns and colors within the boundaries of the object and which can detect objects even in the absence of constraints on the image background. It would also be desirable to provide a formalization of a template structure in terms of simple primitives, a rigorous learning scheme capable of working with real images, and also to provide a technique to apply the ratio template concept to relatively complex object classes such as pedestrians. It would further be desirable to provide a technique and architecture for object detection which is trainable and which may also be used to detect people in static or video images of cluttered scenes. It would further be desirable to provide a system which can detect highly non-rigid objects with a high degree of variability in size, shape, color, and texture and which does not rely on any a priori (hand-crafted) models or on changes in position of objects between frames in a video sequence.

SUMMARY OF THE INVENTION

In accordance with the present invention, an object detection system includes (a) an image preprocessor for moving a window across the image and a classifier coupled to the preprocessor for classifying the portion of the image within the window. The classifier includes a wavelet template generator which generates a wavelet template that defines the shape of an object with a subset of the wavelet coefficients of the image. The wavelet template generator generates a wavelet template which includes a set of regular regions of different scales that correspond to the support of a subset of significant wavelet functions. The relationships between different regions are expressed as constraints on the values of the wavelet coefficients. With this particular arrangement, a system which is trainable and which detects objects in static or video images of cluttered scenes is provided. The wavelet template defines an object as a set of regions and relationships among the regions. Use of a wavelet basis to represent the template yields both a computationally efficient technique and an effective learning scheme. By using a wavelet template that defines the shape of an object in terms of a subset of the wavelet coefficients of the image, the system can detect highly non-rigid objects such as people and other objects with a high degree of variability in size, shape, color, and texture. The wavelet template is invariant to changes in color and texture and can be used to robustly define a rich and complex class of objects such as people. The system utilizes a model that is automatically learned from examples and thus can avoid the use of motion and explicit image segmentation to detect objects in an image. The system further includes a training system coupled to the classifier and including a database including both positive and negative examples; and a quadratic programming solver. The system utilizes a general paradigm for object detection. The system is trainable and utilizes example-based models. Furthermore, the system is reconfigurable and extendible to a wide variety of object classes.

In accordance with a further aspect of the present invention, a wavelet template includes a set of regular regions of different scales that correspond to the support of a subset of significant wavelet functions of an image. The relationships between different regions are expressed as constraints on the values of the wavelet coefficients. The wavelet template can compactly express the structural commonality of a class of objects and is computationally efficient. It is learnable from a set of examples and provides an effective tool for the challenging problem of detecting pedestrians in cluttered scenes. With this particular technique, a learnable wavelet template provides a framework that is extensible to the detection of complex object classes including but not limited to the pedestrian object class. The wavelet template is an extension of the ratio template and addresses some of these issues not addressed by the ratio template in the context of pedestrian detection. By using a wavelet basis to represent the template a computationally efficient technique for detecting objects as well as an effective learning scheme is provided.

The success of the wavelet template for pedestrian detection comes from its ability to capture high-level knowledge about the object class (structural information expressed as a set of constraints on the wavelet coefficients) and incorporate it into the low-level process of interpreting image intensities. Attempts to directly apply low-level techniques such as edge detection and region segmentation are likely to fail in the images which include highly non-rigid objects having a high degree of variability in size, shape, color, and texture since these methods are not robust, are sensitive to spurious details, and give ambiguous results. Using the wavelet template, only significant information that characterizes the object class, as obtained in a learning phase, is evaluated and used.

The approach of the present invention as applied to a pedestrian template is learned from examples and then used for classification, ideally in a template matching scheme. It is important to realize that this is not the only interpretation of the technique. An alternative, and perhaps more general, utilization of the technique includes the step of learning the template as a dimensionality reduction stage. Using all the wavelet functions that describe a window of 128×64 pixels would yield vectors of very high dimensionality. The training of a classifier with such a high dimensionality would in turn require an example set which may be too large to utilize in practical systems using present day technology.

The template learning stage serves to select the basis functions relevant for this task and to reduce their number considerably. In one particular embodiment, the twenty-nine basis functions are used. A classifier, such as a support vector machine (SVM) can then be trained on a small example set. From this point of view, learning the pedestrian detection task consists of two learning steps: (1) dimensionality reduction, that is, task-dependent basis selection and (2) training the classifier. In this interpretation, a template in the strict sense of the word is neither learned nor used. It should be appreciated of course that in other applications and embodiments, it may be desirable to not reduce the number of basis functions but instead it may be desirable to use all available basis functions. In this case, all of the basis functions are provided to the classifier.

In accordance with a still further aspect of the present invention, an object detection system includes an optical flow processor which receives frames from a video sequence and computes the optical flow between images in the frames and a discontinuity detector coupled to the optical flow processor. The discontinuity detector detects discontinuities in the flow field that indicate probable motion of objects relative to the background in the frame. A detection system is coupled to the discontinuity detector and receives information indicating which regions of an image or frame are likely to include objects having motion. With this particular arrangement an object detection system which utilizes motion information to detect objects is provided. The frames may be consecutive frames in a video sequence. The discontinuity detector detects discontinuities in the flow field that indicate probable motion of objects relative to the background and the detected regions of discontinuity are grown using morphological operators, to define the full regions of interest. In these regions of motion, the likely class of objects is limited, thus strictness of the classifier can be relaxed.

BRIEF DESCRIPTION OF THE DRAWINGS

The foregoing features of the invention, as well as the invention itself may be more fully understood from the following detailed description of the drawings, in which.

DESCRIPTION OF THE PREFERRED EMBODIMENTS

Terminology

Figure 1:
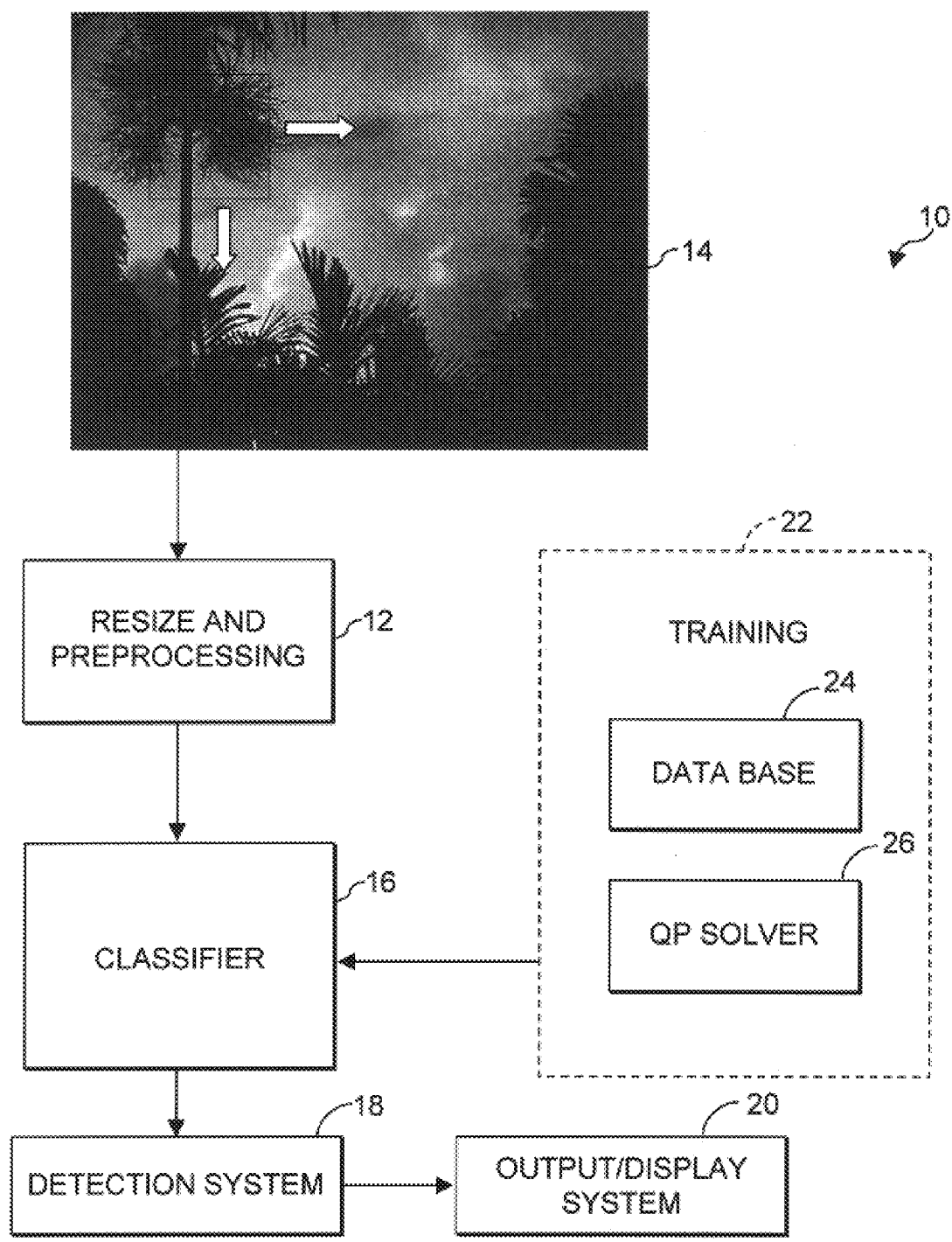
FIG. 1 is a block diagram of an image processing system utilizing a wavelet template generator.

Before describing an object detection system and the operations performed to generate a wavelet template, some introductory concepts and terminology are explained.

An analog or continuous parameter image such as a still photograph may be represented as a matrix of digital values and stored in a storage device of a computer or other digital processing device. Thus, as described herein, the matrix of digital data values are generally referred to as a "digital image" or more simply an "image" and may be stored in a digital data storage device, such as a memory for example, as an array of numbers representing the spatial distribution of energy at different wavelengths in a scene.

Similarly, an image sequence such as a view of a moving roller-coaster for example, may be converted to a digital video signal as is generally known. The digital video signal is provided from a sequence of discrete digital images or frames. Each frame may be represented as a matrix of digital data values which may be stored in a storage device of a computer or other digital processing device. Thus in the case of video signals, as described herein, a matrix of digital data values are generally referred to as an "image frame" or more simply an "image" or a "frame." Each of the images in the digital video signal may be stored in a digital data storage device, such as a memory for example, as an array of numbers representing the spatial distribution of energy at different wavelengths in a scene in a manner similar to the manner in which an image of a still photograph is stored.

Whether provided from a still photograph or a video sequence, each of the numbers in the array correspond to a digital word (e.g. an eight-bit binary value) typically referred to as a "picture element" or a "pixel" or as "image data." The image may be divided into a two dimensional array of pixels with each of the pixels represented by a digital word.

Reference is also sometimes made herein to an image as a two-dimensional pixel array. An example of an array size is an array having 512 rows and 512 columns (denoted 512×512). Specific reference is sometimes made herein to operation on arrays having a particular size (e.g. 128×64, 32×32, 16×16, etc . . . ). One of ordinary skill in the art will of course recognize that the techniques described herein are applicable to various sizes and shapes of pixel arrays including irregularly shaped pixel arrays.

A scene is an image or a single representative frame of video in which the contents and the associated relationships within the image can be assigned a semantic meaning. A still image may be represented, for example, as a pixel array having 512 rows and 512 columns. An object is an identifiable entity in a scene in a still image or a moving or non-moving entity in a video image. For example, a scene may correspond to an entire image while a boat might correspond to an object in the scene. Thus, a scene typically includes many objects and image regions while an object corresponds to a single entity within a scene.

An image region or more simply a region is a portion of an image. For example, if an image is provided as a 32×32 pixel array, a region may correspond to a 4×4 portion of the 32×32 pixel array.

Before describing the processing to be performed by and on networks, it should be appreciated that, in an effort to promote clarity, reference is sometimes made herein to operation on images which include pedestrians and faces. It should be noted, however, that the techniques described herein are not limited to use of detection or classification of pedestrians or faces in images. Rather, the techniques described herein can also be used to detect and/or classify a wide variety objects within images including but not limited to pedestrians, faces, automobiles, animals, and other objects. Accordingly, those of ordinary skill in the art will appreciate that the description and processing taking place on objects which are pedestrians or images which include objects which are pedestrians, could equally be taking place on a objects which are not pedestrians.

Referring now to FIG. 1, an object detection system 10 includes a resize and preprocessing processor 12 which receives an input signal corresponding to at least a portion of a digital image 14 and provides an output signal (a feature vector) to an input port of a classifier 16 which may be provided, for example, as a support vector machine (SVM) 16.

The classifier 16 provides the class information to a detection system 18 which detects objects in particular images and provides output signals to an output/display system 20.

The system 10 can also include a training system 22 which in turn includes an image database 24 and a quadratic programming (QP) solver 26. During a training operation, the training system 22 provides one or more training samples to the classifier 16.

During the training, basis functions having a significant correlation with object characteristics are identified. Various classification techniques well known to those of ordinary skill in the art can be used to learn the relationships between the wavelet coefficients that define a particular class such as a pedestrian class, for example.

The detection system 10 detects objects in arbitrary positions in the image and in different scales. To accomplish this task, the system is trained to detect an object centered in a window of a predetermined size. The window may, for example, be provided as a 128×64 pixel window. Once the training stage is completed, the system is able to detect objects at arbitrary positions by shifting the 128×64 window throughout the image, thereby scanning all possible locations in the image. The scanning step is combined with the step of iteratively resizing the image to achieve multi-scale detection. In one particular embodiment, the image is scaled from 0.2 to 1.5 times its original size, at increments of 0.1.

At any given scale, rather than recomputing the wavelet coefficients for every window in the image, a transform computation for the whole image is performed and shifting is performed in the coefficient space. A shift of one coefficient in the finer scale corresponds to a shift of four pixels in the window and a shift in the coarse scale corresponds to a shift of eight pixels. Since most of the coefficients in the wavelet template are at the finer scale (the coarse scale coefficients undergo a relatively small change with a shift of four pixels), an effective spatial resolution of four pixels is achieved by working in the wavelet coefficient space.

To train the system, images of same class objects from different views are stored in the database and used. For example, to detect pedestrians, frontal and rear images of people from outdoor and indoor scenes can be used. Also, positive example images (i.e. images which include people) and negative example images (i.e. images which do not include people) can be stored in the database and used for training. The initial non-people images in the training database (i.e. the negative image examples) are patterns from natural scenes not containing people. The combined set of positive and negative examples form the initial training database for the classifier. A key issue with the training of detection systems is that, while the examples of the target class, in this case pedestrians, are well defined, there are no typical examples of non-pedestrians. The main idea in overcoming this problem of defining this extremely large negative class is the use of "bootstrapping" training. After the initial training, the system processes arbitrary images that do not contain any people. Any detections are clearly identified as false positives and are added to the database of negative examples and the classifier is then retrained with this larger set of data. These iterations of the bootstrapping procedure allows the classifier to construct an incremental refinement of the non-pedestrian class until satisfactory performance is achieved. This bootstrapping technique is illustrated in conjunction with FIG. 2 below.

Thus given an object class, one problem is how to learn which are the relevant coefficients that express structure common to the entire object class and which are the relationships that define the class. To solve this problem the learning can be divided into a two stage process. The first stage includes identifying a relatively small subset of basis functions that capture the structure of a class. The second stage of the process includes using a classifier to derive a precise class model from the subset of basis functions.

Once the learning stages are complete, the system can detect objects in arbitrary positions and in different scales in an image. The system detects objects at arbitrary positions in an image by scanning all possible locations in the image. This is accomplished by shifting a detection window (see e.g. FIGS. 1 and 4). This is combined with the iterativley re-sizing the image to achieve multi-scale detection.

In one example of detecting face images, faces were detected from a minimum size of 19×19 pixels to 5 time this size by scaling the novel image from 0.2 to 2 times its original size. This can be done in increments such as increments of 0.1. At any given scale, instead of recomputing the wavelet coefficients for every window in the image, the transform can be computed for the whole image and the shifting can be done in the coefficient space.

Once the important basis functions are identified, various classification techniques can be used to learn the relationships between the wavelet coefficients that define a particular class such as the pedestrian class. The system detects people in arbitrary positions in the image and in different scales. To accomplish this task, the system is trained to detect a pedestrian centered in a 128×64 pixel window. Once a training stage is completed, the system is able to detect pedestrians at arbitrary positions by shifting the 128×64 window, thereby scanning all possible locations in the image. This is combined with iteratively resizing the image to achieve multi-scale detection; in accordance with the present invention, scaling of the images ranges from 0.2 to 1.5 times the original image size. Such scaling may be done at increments of 0.1.

At any given scale, instead of recomputing the wavelet coefficients for every window in the image, the transform is computed for the whole image and the shifting is done in the coefficient space. A shift of one coefficient in the finer scale corresponds to a shift of 4 pixels in the window and a shift in the coarse scale corresponds to a shift of 8 pixels. Since most of the coefficients in the wavelet template are at the finer scale (the coarse scale coefficients hardly change with a shift of 4 pixels), we achieve an effective spatial resolution of 4 pixels by working in the wavelet coefficient space.

Figure 2:
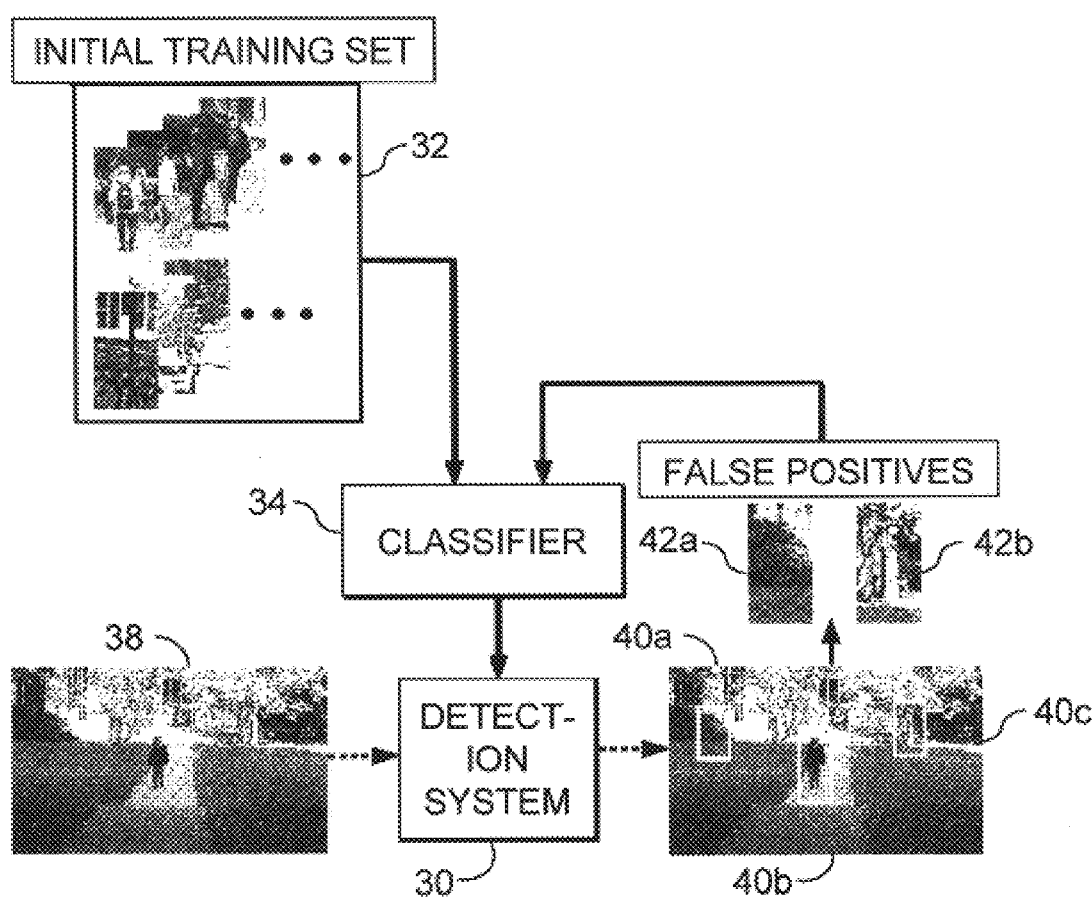
FIG. 2 is a block diagram of a wavelet template image processing system for detecting pedestrians in an image utilizing a bootstrapping technique.

Referring now to FIG. 2, to train a detection system 30, a database of images 32 is used. The image database includes both positive and negative image examples. A positive image example is an image which includes the object of interest. A negative image example, on the other-hand refers to an image which does not include the object of interest. Thus, in the case where the detection system is a pedestrian detection system, a positive image would include a pedestrian while a negative image would not include a pedestrian.

Considering detection system 30 as a pedestrian detection system, the database of images 32 would thus include frontal and rear images of people from outdoor and indoor scenes. The database 32 would also include an initial set of non-people images in the training database 32. Such non-people images could correspond to patterns from nature or other scenes not containing people. The combined set of positive and negative examples form the initial training database 32 is provided to a classifier 34.

Classifier 34 provides information (i.e. a likelihood estimate of the object belonging to the class) to the detection system 30 which allows the detection system 30 to receive a new image 38 and to detect objects of interest in the image. In particular example, the objects of interest are pedestrians 40a–40c as shown. As also can be seen, objects 40a and 40c detected by system 30 do not-correspond to pedestrians. Thus, these objects correspond to so-called false positive images 42a, 42b which are provided to classifier 34 and identified as false positive images. Classifier 34 receives the false positive images 42a, 42b and uses the images as additional learning examples.

One important issue with the training of detection systems is that, while the examples of the target class, in this case pedestrians, are well defined, there are no typical examples of non-pedestrians. The main idea in overcoming this problem of defining this extremely large negative class is the use of "bootstrapping" training.

In bootstrap training, after the initial training, the system is presented with arbitrary images that do not contain any people. Any images detected are clearly identified as false positives and are added to the database of negative examples and the classifier 34 is then retrained with this larger set of data. These iterations of the bootstrapping procedure allows the classifier 34 to construct an incremental refinement of the non-pedestrian class until satisfactory performance is achieved.

Figure 2A:
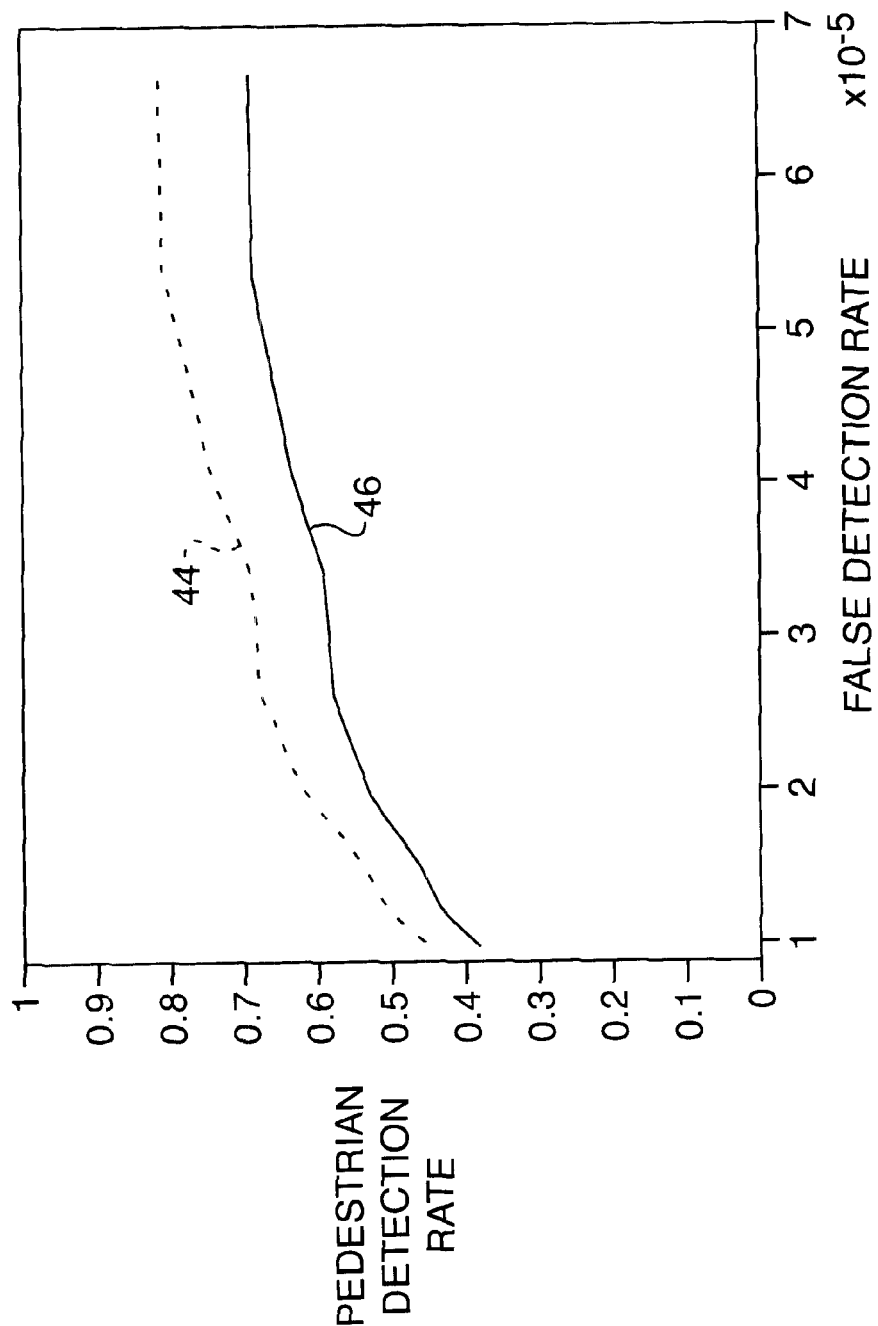
FIG. 2A is a plot of Pedestrian Detection Rate vs. False Detection Rate.

Described below in conjunction with FIG. 2A is the template learning stage which includes the identification of the significant coefficients that characterize the object class (e.g. the pedestrian class). These coefficients are used as the feature vector for various classification methods.

The simplest classification scheme is to use a basic template matching measure. Normalized template coefficients are divided into two categories: coefficients above 1 (indicating strong change) and below 1 (weak change). For every novel window, the wavelet coefficients are compared to the pedestrian template. The matching value is the ratio of coefficients in agreement. While this basic template matching scheme is relatively simple, it performs relatively well detecting relatively complex objects such as pedestrians.

Instead of using a classifier 34 which utilizes a relatively simple template matching paradigm, a relatively sophisticated classifier 34 which will learn the relationship between the coefficients from given sets of positive and negative examples is preferably used. The classifier can learn more refined relationships than the simple template matching schemes and therefore can provide more accurate detection.

In one embodiment, the classification technique used is the support vector machine (SVM). This technique has several features that make it particularly attractive. Traditional training techniques for classifiers, such as multi-layer perceptions (MLP), use empirical risk minimization and only guarantee minimum error over the training set. In contrast, the SVM machinery uses structural risk minimization which minimizes a bound on the generalization error and therefore should perform better on novel data. Another interesting aspect of the SVM is that its decision surface depends only on the inner product of the feature vectors. This leads to an important extension since the Euclidean inner product can be replaced by any symmetric positive-definite kernel K(x,y). This use of a kernel is equivalent to mapping the feature vectors to a high-dimensional space, thereby significantly increasing the discriminative power of the classifier. In the pedestrian classification problem, for example, it has been found that using a polynomial of degree two as the kernel provides good results.

It should be noted, that from the view point of the classification task, one could use the entire set of coefficients as a feature vector. It should also be noted, however, that using all the wavelet functions that describe a window of 128×64 pixels, over a few thousands, would yield vectors of very high dimensionality. The training of a classifier with such a high dimensionality would in turn require a relatively large example set. The template learning stage to be described below, serves to select the basis functions relevant for this task and to reduce their number considerably. In one embodiment directed toward pedestrian detection, twenty-nine basis functions are used.

To evaluate the system performance, the system was operated using a database of 564 positive image examples and 597 negative image examples. The system then undergoes the bootstrapping cycle described above. In one embodiment in which pedestrians were detected, the support vector system undergoes three bootstrapping steps, ending up with a total of 4597 negative examples. For the template matching version a threshold of 0.7 (70% matching) was empirically found to yield good results.

Out-of-sample performance was evaluated over a test set consisting of 72 images for both the template matching scheme and the support vector classifier. The test images contain a total of 165 pedestrians in frontal or near-frontal poses; 24 of these pedestrians are only partially observable (e.g. with body regions that are indistinguishable from the background). Since the system was not trained with partially observable pedestrians, it is expected that the system would not be able to detect these instances. To give a fair account of the system, statistics are presented for both the total set and the set of 141 "high quality" pedestrian images. Results of the tests are presented in Table 1 for representative systems using template matching and support vectors.

TABLE 1

|  | Detection Rate | Detection Rate for High Quality Class | False Positive Rate (per window) |
| --- | --- | --- | --- |
| Template Matching | 52.7% | 61.7% | 1:5,000 |
| SVM | 69.7% | 81.6% | 1:15,000 |

As can be seen in Table 1, The template matching system has a pedestrian detection rate of 52.7%, with a false positive rate of 1 for every 5,000 windows examined. The success of such a straightforward template matching measure, which is much less powerful than the SMV classifier, suggests that the template learning scheme extracts non-trivial structural regularity within the pedestrian class.

For the more sophisticated system with the support vector classifier, a more thorough analysis can be performed. In general, the performance of any detection system exhibits a tradeoff between the rate of detection and the rate of false positives. Performance drops as impose more stringent restrictions are imposed on the rate of false positives. To capture this tradeoff, the sensitivity of the system is varied by threshholding the output and evaluating a Receiver Operating Characteristic (ROC) curve.

Referring briefly to FIG. 2A, a plot of Pedestrian Detection Rate vs. False Detection Rate (an ROC curve) is shown. Curve 46 (solid line) is over the entire test set while curve 44 is over a "high quality" test set. Examination of the curves 44, 46 illustrates, for example, that if a tolerance of one false positive for every 15,000 windows examined exists, the system can achieve a detection rate of 69.6%, and as high as 81.6% on a "high quality" image set. It should be noted that the support vector classifier with the bootstrapping performs better than a "naive" template matching scheme.

Although training using only frontal and rear views of pedestrians is discussed above, it should be appreciated that the classifier can also be trained to handle side views in a manner substantially the same as that herein described for training of front and rear views.

Figure 2B:
FIG. 2B is a subset of training images for training a wavelet template image processing system for detecting pedestrians.

Referring now to FIG. 2B, a plurality of typical images of people 48 which may be stored in the database 32 (FIG. 2) are shown. Examination of these images illustrates the difficulties of pedestrian detection as evidenced by the significant variability in the patterns and colors within the boundaries of the body.

As can be observed in FIG. 2B, there are no consistent patterns in the color and texture of pedestrians or their backgrounds in arbitrary cluttered scenes in unconstrained environments. This lack of clearly discernible interior features is circumvented by relying on (1) differences in the intensity between pedestrian bodies and their backgrounds and (2) consistencies within regions inside the body boundaries. The wavelet coefficients can be interpreted as indicating an almost uniform area, i.e. "no-change", if their absolute value is relatively small, or as indicating "strong change" if their absolute value is relatively large. The wavelet template sought to be identified consists solely of wavelet coefficients (either vertical, horizontal or corner) whose types ("change"/"no-change") are both clearly identified and consistent along the ensemble of pedestrian images; these comprise the "important" coefficients.

The basic analysis to identify the template consists of two steps: first, the wavelet coefficients are normalized relative to the rest of the coefficients in the patterns; second, the averages of the normalized coefficients are analyzed along the ensemble. A relatively large number of images can be used in the template learning process. In one embodiment, a set of 564 color images of people similar to those shown in FIG. 2A are used in the template learning.

Each of the images are scaled and clipped to the dimensions 128×64 such that the people are centered and approximately the same size (the distance from the shoulders to feet is about 80 pixels). In this analysis, restriction is made to the use of wavelets at scales of 32×32 pixels (one array of 15×5 coefficients for each wavelet class) and 16×16 pixels (29×13 for each class). For each color channel (RGB) of every image, a quadruple dense Haar transform is computed and the coefficient value corresponding to the largest absolute value among the three channels is selected. The normalization step computes the average of each coefficient's class ({vertical, horizontal, corner}×{16,32}) over all the pedestrian patterns and divides every coefficient by its corresponding class average. Separate computations of the averages for each class are made since the power distribution between the different classes may vary.

To begin specifying the template, a calculation is made of the average of each normalized coefficient over the set of pedestrians. A base set of 597 color images of natural scenes of size 128×64 that do not contain people were gathered to compare with the pedestrian patterns and are processed as above. Tables 2A and 2B show the average coefficient values for the set of vertical Haar coefficients of scale 32×32 for both the non-pedestrian (Table 2A) and pedestrian (Table 2B) classes.

Table 2A shows that the process of averaging the coefficients within the pattern and then in the ensemble does not create spurious patterns; the average values of these non-pedestrian coefficients are near 1 since these are random images that do not share any common pattern. The pedestrian averages, on the other hand, show a clear pattern, with strong response (values over 1.5) in the coefficients corresponding to the sides of the body and weak response (values less than 0.5) in the coefficients along the center of the body.

TABLE 2A

| 1.18 | 1.14 | 1.16 | 1.09 | 1.11 |
| 1.13 | 1.06 | 1.11 | 1.06 | 1.07 |
| 1.07 | 1.01 | 1.05 | 1.03 | 1.05 |
| 1.07 | 0.97 | 1.00 | 1.00 | 1.05 |
| 1.06 | 0.99 | 0.98 | 0.98 | 1.04 |
| 1.03 | 0.98 | 0.95 | 0.94 | 1.01 |
| 0.98 | 0.97 | 0.96 | 0.91 | 0.98 |
| 0.98 | 0.96 | 0.98 | 0.94 | 0.99 |
| 1.01 | 0.94 | 0.98 | 0.96 | 1.01 |
| 1.01 | 0.95 | 0.95 | 0.96 | 1.00 |
| 0.99 | 0.95 | 0.92 | 0.93 | 0.98 |
| 1.00 | 0.94 | 0.91 | 0.92 | 0.96 |
| 1.00 | 0.92 | 0.93 | 0.92 | 0.96 |

Table 2B shows that the pedestrian averages have a clear pattern, with strong response (values over 1.5) in the coefficients corresponding to the sides of the body and weak response (values less than 0.5) in the coefficients along the center of the body.

TABLE 2B

| 0.62 | 0.74 | 0.60 | 0.75 | 0.66 |
| 0.76 | 0.92 | 0.54 | 0.88 | 0.81 |
| 1.07 | 1.11 | 0.52 | 1.04 | 1.15 |
| 1.38 | 1.17 | 0.48 | 1.08 | 1.47 |
| 1.65 | 1.27 | 0.48 | 1.15 | 1.71 |
| 1.62 | 1.24 | 0.48 | 1.11 | 1.63 |
| 1.44 | 1.27 | 0.46 | 1.20 | 1.44 |
| 1.27 | 1.38 | 0.46 | 1.34 | 1.27 |
| 1.18 | 1.51 | 0.46 | 1.48 | 1.18 |
| 1.09 | 1.54 | 0.45 | 1.52 | 1.08 |
| 0.94 | 1.38 | 0.42 | 1.39 | 0.93 |
| 0.74 | 1.08 | 0.36 | 1.11 | 0.72 |
| 0.52 | .74 | 0.29 | 0.77 | 0.50 |

A gray level coding scheme can be used to visualize the patterns in the different classes and values of coefficients. The values can be displayed in the proper spatial layout. With this technique, coefficients close to 1 are gray, stronger coefficients are darker, and weaker coefficients are lighter.

Figure 3:
FIG. 3 is an image diagrammatically illustrating a dictionary of basis functions which encode differences in the intensities among different regions of an image.
Figure 3A:
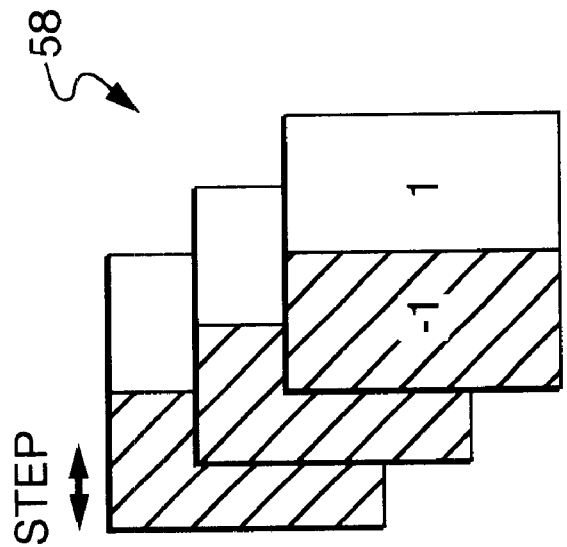
FIG. 3A is a diagrammatical representation of a basis function.
Figure 3A:
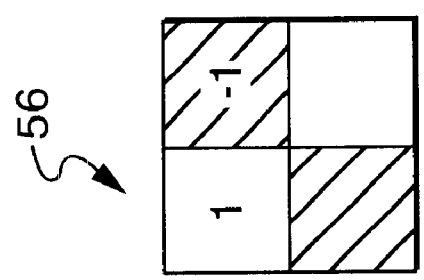
Figure 3A:
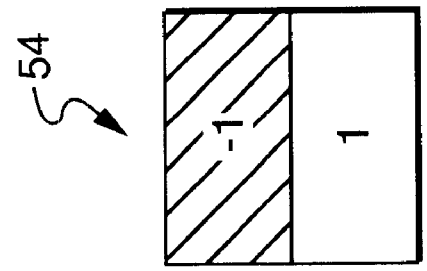
Figure 3A:
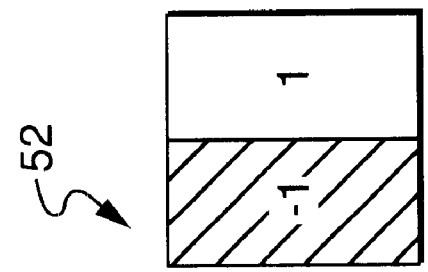

Referring now to FIGS. 3 and 3A, it is desirable to locate an image representation which captures the relationship between average intensities of neighboring regions. To accomplish this, a family of basis functions, such as the Haar wavelets, which encode such relationships along different orientations can be used.

The Haar wavelet representation has also been used in prior art techniques for image database retrieval where the largest wavelet coefficients are used as a measure of similarity between two images.

In accordance with the present invention, however, a wavelet representation is used to capture the structural similarities between various instances of the class. In FIG. 3A, three types of 2-dimensional Haar wavelets 52–56 are depicted. These types include basis functions which capture change in intensity along the horizontal direction, the vertical direction and the diagonals (or corners). Since the wavelets that the standard transform generates have irregular support, a non-standard two-dimensional DWT is used where, at a given scale, the transform is applied to each dimension sequentially before proceeding to the next scale. The results are Haar wavelets with square support at all scales. Also depicted in FIG. 3A is a quadruple density 2D Haar basis 58.

The spatial sampling of the standard Haar basis is not dense enough for all applications. For example the Haar basis is not dense enough for a pedestrian detection application. For a 1-dimensional transform, the distance between two neighboring wavelets at level n (with support of size $2^n$) is $2^n$. For better spatial resolution, a set of redundant basis functions, or an over-complete dictionary, where the distance between the wavelets at scale n is $\frac{1}{4}$ $2^n$ is required. This is referred to as a quadruple density dictionary.

As can be observed, the straightforward approach of shifting the signal and recomputing the DWT will not generate the desired dense sampling. However, one can observe that in the standard wavelet transform, after the scaling and wavelet coefficients are convolved with the corresponding filters there is a step of downsampling. If the wavelet coefficients are not downsampled, wavelets with double density are generated, where wavelets of level n are centered every $\frac{1}{2}$ $2^n$. A quadruple density dictionary is generated by computing the scaling coefficients with double density rather than by downsampling them. The next step is to calculate double density wavelet coefficients on the two sets of scaling coefficients—even and odd—separately. By interleaving the results of the two transforms quadruple density wavelet coefficients are provided.

For the next scale only the even scaling coefficients of the previous level are kept and the quadruple transform is repeated on this set only. The odd scaling coefficients are dropped off. Since only the even coefficients are carried along at all the scales, this avoids an "explosion" in the number of coefficients, yet provides a dense and uniform sampling of the wavelet coefficients at all the scales. As with the regular DWT, the time complexity is 0(n) in the number of pixels n. The extension for the 2-dimensional transform is straight-forward and after reading the present disclosure is within the level of one of ordinary skill in the art.

The Haar wavelets thus provide natural set basis functions which encode differences in average intensities between different regions. To achieve the spatial resolution necessary for detection and to increase the expressive power of a model, the quadruple transform is used. As mentioned above, the quadruple transform yields an over complete set of bases functions. Thus, whereas for a wavelet with size $2^n$, the standard Haar transform shifts each wavelet by n the quadruple density transform shifts the wavelet by $¼2^n$ in each direction. The use of this quadruple density transform results in the overcomplete dictionary of basis functions that facilitate the definition of complex constraints on the object patterns. Moreover there is n loss of computational efficiency with respect to the standard wavelet transform.

The ratio template defines a set of constraints on the appearance of an object by defining a set of regions and a set of relationships on their average intensities. The relationships can require, for example, that the ratio of intensities between two specific regions falls within a certain range. The issues of learning these relationships, using the template for detection, and its efficient computation is addressed by establishing the ratio template in the natural framework of Haar wavelets. Each wavelet coefficient describes the relationship between the average intensities of two neighboring regions. If the transform on the image intensities is computed, the Haar coefficients specify the intensity differences between the regions; computing the transform on the log of the image intensities produces coefficients that represent the log of the ratio of the intensities. Furthermore, the wavelet template can describe regions with different shapes by using combinations of neighboring wavelets with overlapping support and wavelets of different scales. The wavelet template is also computationally efficient since the transform is computed once for the whole image and different sets of coefficients are examined for different spatial locations.

Figures 3B, 3C, 3D, 3E, 3F, 3G, 3H:
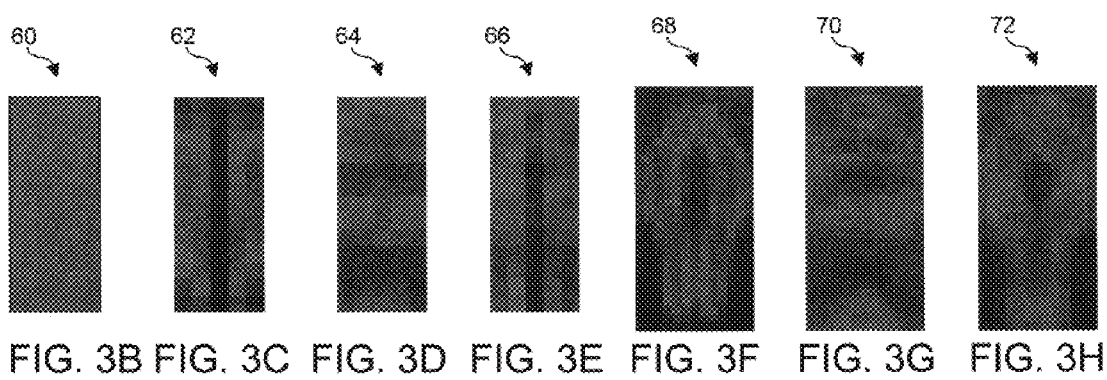
FIGS. 3B–3H are a series of diagrams illustrating ensemble average values of wavelet coefficients for pedestrians coded using gray level coding.

Referring now to FIGS. 3B–3H, the ensemble average values of the wavelet coefficients coded using gray level are shown in images 60–72. Coefficients having values above the template average are darker while those below the average are lighter. FIG. 3B shows the vertical coefficients of random images and as expected, this figure is uniformly gray. The corresponding images for the horizontal and corner coefficients (not shown here) are similar. In contrast FIGS. 3C–3E, show vertical, horizontal and corner coefficients of scale 32×32 images of people. The coefficients of the images with people show clear patterns with the different classes of wavelet coefficients being tuned to different types of structural information. The vertical wavelets, FIG. 3C, capture the sides of the pedestrians. The horizontal wavelets, FIG. 3D, respond to the line from shoulder to shoulder and to a weaker belt line. The corner wavelets, FIG. 3E, are better tuned to corners, for example, the shoulders, hands and feet. FIGS. 3F–3H, show vertical, horizontal and corner coefficients, respectively, of scale 16×16 images of people. The wavelets of finer scale in FIG. 3F–3H provide better spatial resolution of the body's overall shape and smaller scale details such as the head and extremities appear clearer. Two similar statistical analyses using (a)the wavelets of the of the intensities and (b) the sigmoid function as a "soft threshold" on the normalized coefficients yields results that are similar to the intensity differencing wavelets. It should be noted that a basic measure such as the ensemble average provides clear identification of the template as can be seen from FIGS. 3B–3H.

Figure 3I:
FIG. 3I is a diagram of a pedestrian image having coefficients disposed thereon.

Referring now to FIG. 3I, the significant wavelet bases for pedestrian detection that were uncovered during the learning strategy are shown overlayed on an example image of a pedestrian 74. In this particular example, the template derived form the learning uses a set of 29 coefficients that are consistent along the ensemble (FIGS. 3B–3H) either as indicators if "change" or "no-change." There are 6 vertical and 1 horizontal coefficients at the scale of 32×32 and 14 vertical and 8 horizontal at the scale of 16×16. These coefficients serve as the feature vector for the ensuing classification problem.

In FIGS. 3B–3I, it can be seen that the coefficients of people show clear patterns with the different classes of wavelet coefficients being tuned to different types of structural information. The vertical wavelets capture the sides of the pedestrians. The horizontal wavelets respond to the line from shoulder to shoulder and to a weaker belt line. The corner wavelets are better tuned to corners, for example, the shoulders, hands and feet. The wavelets of finer scale provide better spatial resolution of the body's overall shape and smaller scale details such as the head and extremities appear clearer.

Two similar statistical analyses using (a) the wavelets of the of the intensities and (b) the sigmoid function as a "soft threshold" on the normalized coefficients yields results that are similar to the intensity differencing wavelets. It should be noted that a basic measure like the ensemble average provides clear identification of the template as shown in FIGS. 3B–3H.

Figure 4:
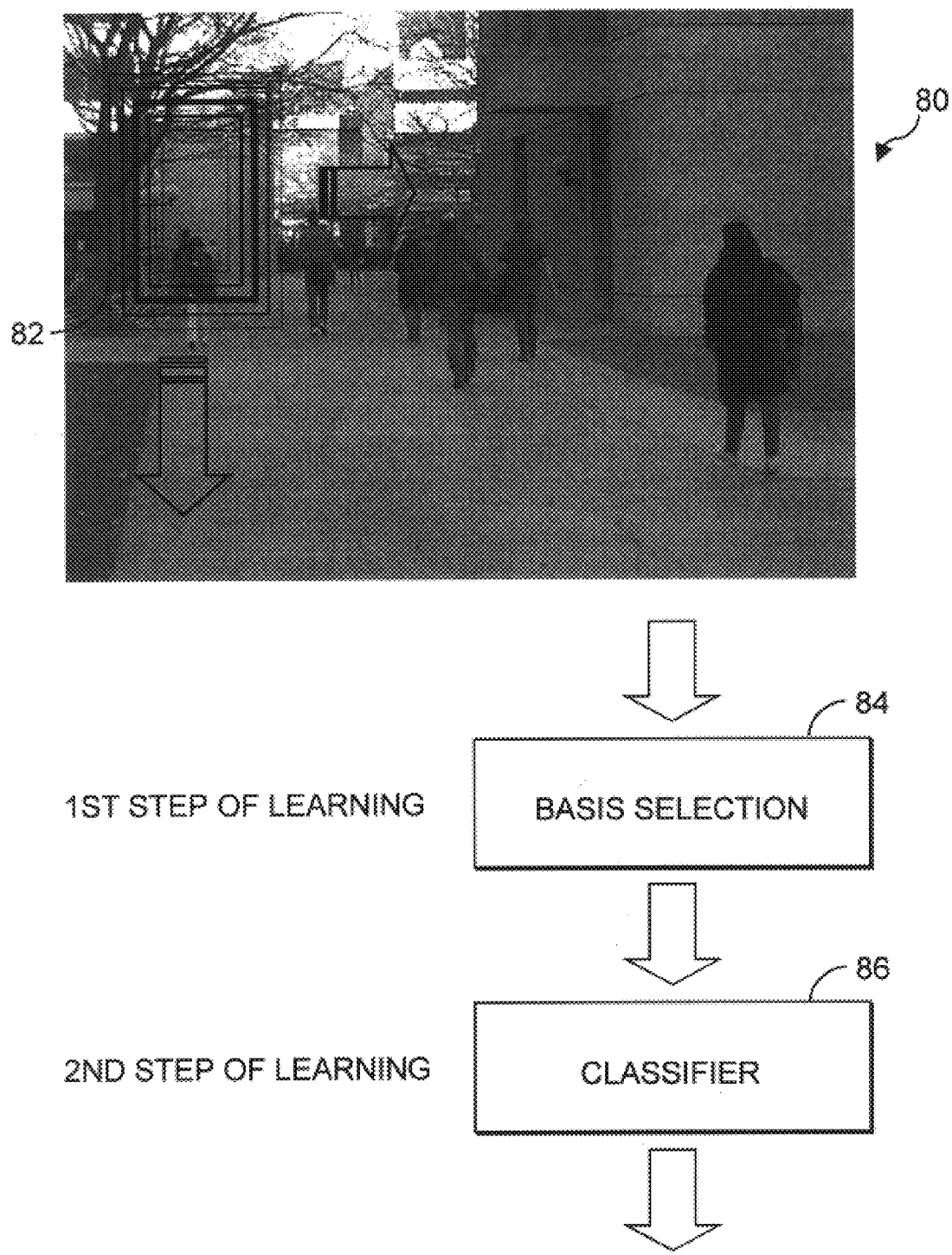
FIG. 4 is a block diagram of an image processing system architecture.

Referring now to FIG. 4, a graphical illustration of learning is shown. A window 82 (e.g. a 128×64 pixel window) moves across an image 80. The first stage of learning results in a basis selection 84 and in the second stage of learning, the selected bases are provided to a classifier 86 which may, for example, be provided as an SVM classifier.

To learn the significant bases functions, a set of images of the object class of interest is used. In one particular example where the object class is faces, a set of grey-scale images of a predetermined face sized is used. For example, a set of 2429 grey-scale images of face size 19×19 including a core set of faces with some small angular rotations (to improved generalizations may be used). For the wavelet coefficient analysis, wavelets at scales having dimensions selected to correspond to typical features of the object of interest may be used. For example, in the case where the objects of interest are faces and the images have face sizes on the order of 19×19 pixels, wavelets at scales of 4×4 pixels and 2×2 pixels can be used since their dimensions correspond to typical facial features for this size of face image. Thus, in the above example, there exists a total of 173 coefficients.

The basic analysis in identifying the important coefficients includes two steps. Since the power distribution of different types of coefficients may vary, the first step is to compute the class average of ({vertical, horizontal, diagonal)} {2×4} for a total of 8 classes) and normalize every coefficient by its corresponding average class.

The second step is to average the normalized coefficients over the entire set of examples. The normalization has the property that the average value of coefficients of random patterns will be 1. If the average value of a coefficient is much greater than 1, this indicates that the coefficient is encoding a boundary between two regions that is consistent along the examples, of the class. Similarly, if the average value of a coefficient is much smaller than 1, that coefficient encodes a uniform region.

Once the important basis functions have been identified, various classification techniques can be used to learn the relationships between the wavelet coefficients that define the object class. The system can be trained using the bootstrapping technique described above in conjunction with FIG. 2.

Figure 5:
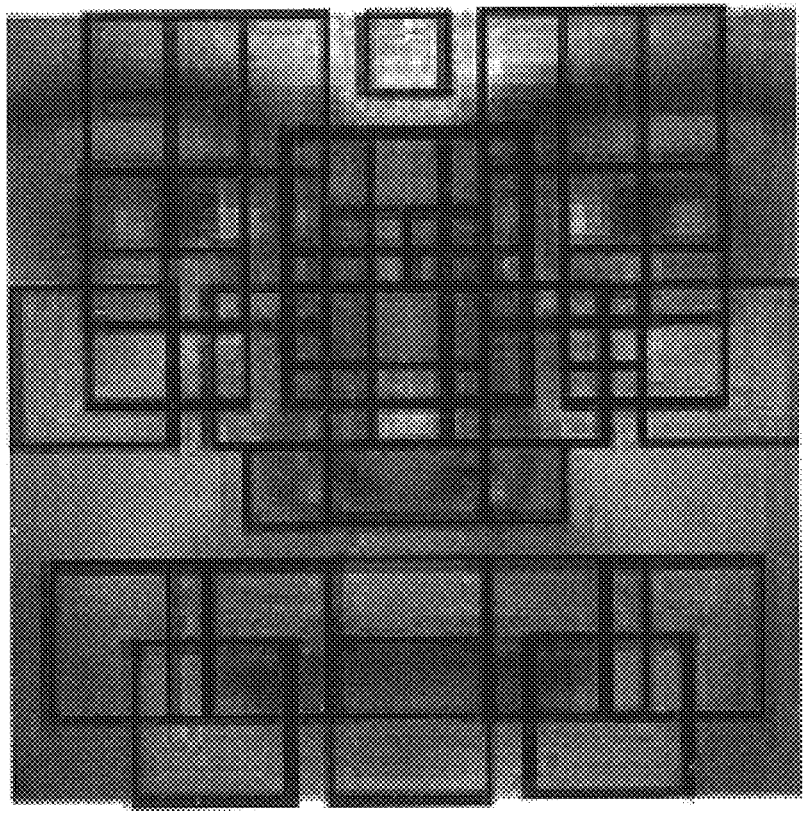
FIG. 5 is a diagrammatical representation of a face image having a predetermined number of basis coefficients disposed thereover.
Figures 5A, 5B, 5C, 5D, 5E, 5F:
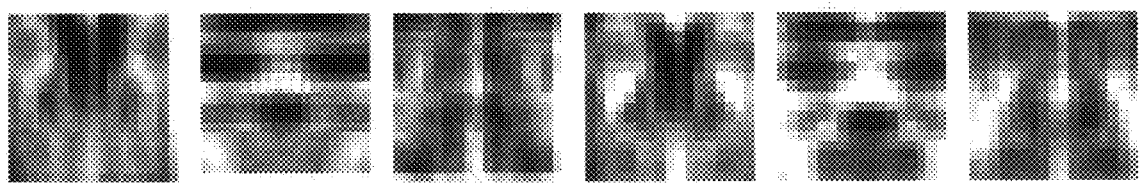
FIGS. 5A–5F are a series of diagrams illustrating ensemble average values of wavelet coefficients for face images coded using gray level coding.

With reference now to FIGS. 5–5F, to illustrate the first stage of learning which results in a basis selection, FIGS. 5A–5F are a series of images 92a–92f used to illustrate the steps to determine significant wavelet bases for face detection that are uncovered through the learning strategy of the present invention. In FIG. 5, the so-identified significant basis functions are disposed over an image 90.

Figure 5G:
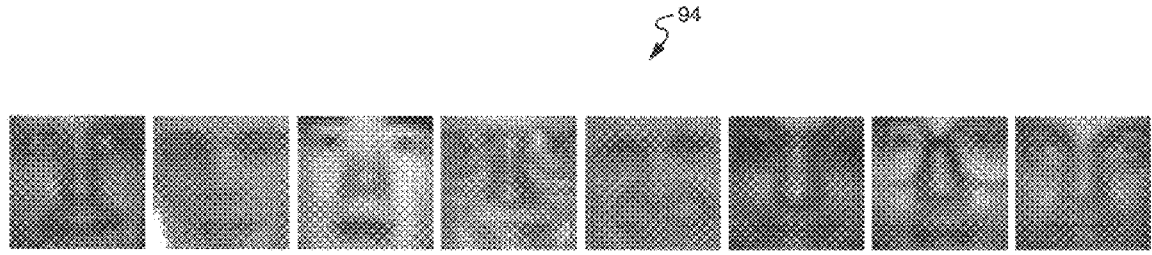
FIG. 5G is a set of training images for training a wavelet template image processing system for detecting pedestrians.

FIG. 5G shows several exemplary face images 94 used for training from which the ensemble average values of the wavelet coefficients of FIGS. 5A–5F are generated. The images in FIG. 5G are gray level of size 19×19 pixels.

In FIGS. 5–5F, the coefficients' values are coded using grey-scale where each coefficient, or basis function, is drawn as a distinct square in the image. The arrangement of squares corresponds to the spatial location of the basis functions, where strong coefficients (relatively large average values) are coded by darker grey levels and weak coefficients (relatively small average values) are coded by lighter grey levels. It is important to note that in FIGS. 5A–5F, a basis function corresponds to a single square in each image and not the entire image. It should be noted that in this particular example, the different types of wavelets capture various facial features. For example, vertical, horizontal and diagonal wavelets capture eyes, nose and mouth. In other applications (e.g. objects other than faces) the different wavelets should capture various features of the particular object.

FIGS. 5A–5F illustrate ensemble average values of the wavelet coefficients for faces coded using color. Each basis function is displayed as a single square in the images above. Coefficients whose values are close to the average value of 1 are coded gray, the ones which are above the average are coded using red and below the average are coded using blue. It can be seen from observing FIGS. 5A–5F the strong features in the eye areas and the nose. Also, the cheek area is an area of almost uniform intensity, i.e. below average coefficients. FIGS. 5A–5C are vertical, horizontal and diagonal coefficients, respectively, of scale 4×4 of images of faces. FIGS. 5D–5F are vertical$_1$ horizontal and diagonal coefficients, respectively, of scale 2×2 of images of faces.

From the statistical analysis, a set of 37 coefficients can be derived from both the course and finer scales, that capture the significant feature of the face. These significant bases include 12 vertical, 14 horizontal and 3 diagonal coefficients at the scale of 4×4 and 3 vertical, 2 horizontal and 3 corner coefficients at the scale of 2×2. FIG. 5 shows a typical human face from the training database with the significant 37 coefficients drawn in the proper configuration.

For the task of pedestrian detection, in one example a database of 924 color images of people was used. Several of such images are shown in FIG. 2B above. A similar analysis of the average values of the coefficients was done for the pedestrian class and FIGS. 3B–3H show the grey-scale coding similar to FIGS. 5A–5F for the face class. It should be noted that for the pedestrian class, there are no strong internal patterns as in the face class. Rather, the significant basis functions are along the exterior boundary of the class, indicating a different type of significant visual information. Through the same type of analysis as used for the face class, for the pedestrian class, 29 significant coefficients are chosen from the initial, overcomplete set of 1326 wavelet coefficients. These basis functions are shown overlayed on an example pedestrian in FIG. 3I.

It should be noted that from the viewpoint of the classification task, the whole set of coefficients could be used as a feature vector. As mentioned above however, using all wavelet functions that describe a window of 128×64 pixels in the case of pedestrians, for example, would yield vectors of very high dimensionality. The training of a classifier with such a high dimensionality, on the order of 1000, would in turn a relatively large example set which makes such an approach somewhat impractical using current technology (i.e. current commercially available microprocessor speeds, etc . . . ). This dimensionality reduction stage serves to select the basis functions relevant for this task and to reduce considerably the number basis functions required.

To evaluate the face detection system performance, a database of 2429 positive examples and 100 negative examples was used. Several systems were trained using different penalties for misclassification. The systems undergo the bootstrapping cycle detailed discussed above in conjunction with FIG. 2 to arrive at between 4500 and 9500 negative examples. Out-of-sample performance was evaluated using a set of 131 faces and the rate of false detection was determined by running the system over approximately 900,000 patterns from images of natural scenes that do not contain either faces or people. With this arrangement, if one false detection is allowed per 7,500 windows examined, the rate of correctly detected faces reaches 75%. It is also seen in such a system that higher penalties for missed positive examples may result in better performance.

Figure 6:
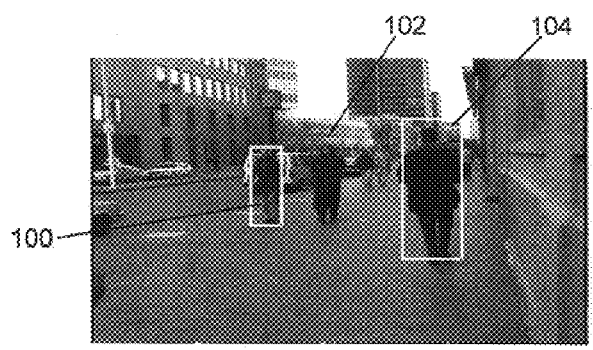
FIGS. 6–6C are a series of images showing the sequence of steps to utilize motion in the detection of objects.
Figure 6A:
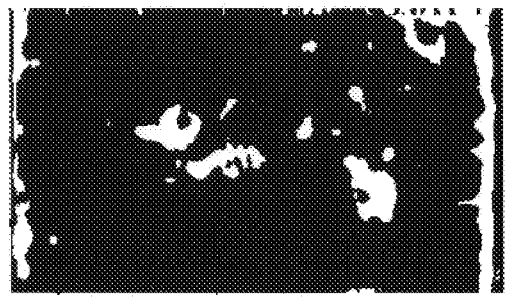
Figure 6B:
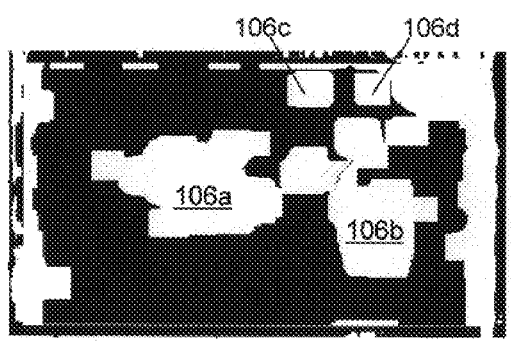
Figure 6C:
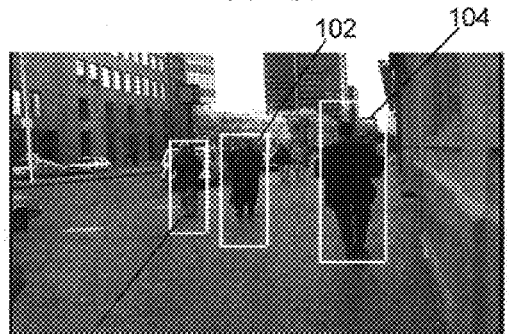

Referring now to FIGS. 6–6C, the sequence of steps in a system which utilizes motion-information are shown. FIG. 6 illustrates static detection results, FIGS. 6A, 6B Illustrate full motion regions and FIG. 6C illustrates improved detection results using the motion information.

In the case of video sequences, motion information can be utilized to enhance the robustness of the detection. Using the pedestrian detection system as a example, the optical flow between consecutive images are first computed. Next discontinuities in the flow field that indicate probable motion of objects relative to the background are detected. The detected regions of discontinuity are grown using morphological operators, to define the full regions of interest 106a–106d. In these regions of motion, the likely class of objects is limited, thus strictness of the classifier can be relaxed.

It is important to observe that, unlike most people detection systems, it is not necessary to assume a static camera nor is it necessary to recover camera ego-motion. Rather, the dynamic motion information is used to assist the classifier. Additionally, the use of motion information does not compromise the ability of the system to detect non-moving people.

Examination of FIGS. 6–6C illustrate how the motion cues enhance the performance of the system. For example, without the use if motion cues, in FIG. 6 the pedestrian 102 is not detected. However, using the motion cues from two successive frames in a sequence (FIGS. 6A, 6B) pedestrian 102 is detected in FIG. 6C.

In FIG. 6B the areas of motion are identified using the technique described above and correspond to regions 106a–106d. It should be noted that pedestrian 102 falls within region 106a.

The system is tested over a sequence of 208 frames. The results of the test are summarized in Table 3 below. Table 3 shows the performance of the pedestrian detection system with the motion-based extensions, compared to the base system. Out of a possible 827 pedestrians in the video sequence—including side views for which the system is not trained—the base system correctly detects 360 (43.5%) of them with a false detection rate of 1 per 236,500 windows. The system enhanced with the motion module detects 445 (53.8%) of the pedestrians, a 23.7% increase in detection accuracy, while maintaining a false detection rate of 1 per 90,000 windows. It is important to iterate that the detection accuracy for non-moving objects is not compromised; in the areas of the image where there is no motion, the classifier simply runs as before. Furthermore, the majority of the false positives in the motion enhanced system are partial body detections; i.e., a detection with the head cut off, which were still counted as false detections. Taking this factor into account, the false detection rate is even lower.

TABLE 3

|  | Detection Rate | False Positive Rate (per window) |
| --- | --- | --- |
| Base system | 43.5% | 1:236,500 |
| Motion Extension | 53.8% | 1:90,000 |

The relaxation paradigm has difficulties when there are a large number of moving bodies in the frame or when the pedestrian motion is very small when compared to the camera motion. Based on these results, it is believed that integration of a trained classifier with the module that provides motion cues could be extended to other systems as well.

As indicated heretofore, aspects of this invention pertain to specific "method functions" implementable on computer systems. Those skilled in the art should readily appreciate that programs defining these functions can be delivered to a computer in many forms; including, but not limited to: (a) information permanently stored on non-writable storage media (e.g., read only memory devices within a computer or CD-ROM disks readable by a computer I/O attachment); (b) information alterably stored on writable storage media (e.g., floppy disks and hard drives); or (c) information conveyed to a computer through communication media such as telephone networks. It should be understood, therefore, that such media, when carrying such information, represent alternate embodiments of the present invention.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A system for processing an image, the system comprising:
   an image database which includes a set of example images at least some of which include objects of interest; and
   a classifier, coupled to said image database, to receive an image from said database and to process said image, said classifier including a wavelet template generator, said wavelet template generator comprising:
   (1) a wavelet scale selector to select at least one wavelet scale which corresponds to at least one feature of the object of interest;
   (2) a wavelet coefficient processor for computing wavelet coefficients at each of the at least one wavelet scales; and
   (3) a normalization processor to receive the wavelet coefficients and to normalize the wavelet coefficients such that an average value of the wavelet coefficients of a random pattern is a predetermined value.

2. The system of claim 1 further comprising:
   an image preprocessor coupled to receive images from said image database and to provide at least a portion of an image to said classifier, said image pre-processor for moving a window across an image selected from the database; and
   a resizing preprocessor for scaling an image from a first size to a second size at a predetermined increment and for providing each of the scaled images to said classifier.

3. The system of claim 1 further comprising a training system coupled to said classifier, said training system comprising:
   an image database containing a first plurality of positive example images and a second plurality of negative example images; and
   a quadratic programming solver wherein said training system provides negative example images to said classifier and any object detected by said classifier in the negative example images are identified as false positive images and are added to the second plurality of negative example images.

4. The system of claim 3 further comprising:
   an image retrieval device coupled to said image database for retrieving images from said image database;
   a relationship processor, coupled to said image retrieval device, said relationship processor for identifying relationships between image characteristics of images retrieved from said database;
   a wavelet template generator, coupled to said relationship processor, said wavelet template generator for encoding relationships between characteristics which are consistent between images retrieved from said database as a wavelet image template; and
   an image detector for applying the wavelet image template to images in said image database to detect images belonging to a particular class of images stored in said image database.

5. The image processing system of claim 4 wherein said image detector detects novel images having relative relationships between selected image regions thereof which are consistent with the relative relationships encoded in the wavelet image template.

6. The image processing system of claim 5 wherein said wavelet template generator comprises:
   a wavelet scale selector to select at least one wavelet scale which corresponds to at least one feature of the object of interest;
   a wavelet coefficient processor for computing wavelet coefficients at each of the least one wavelet scales; and
   a normalization processor to receive the wavelet coefficients and to normalize the wavelet coefficients such that an average value of the wavelet coefficients of a random pattern is a predetermined value.

7. A method of generating a model for use in an image processing system, the method comprising the steps of:
- (a) providing a set of example images at least some of which include objects of interest to a classifier;
- (b) selecting at least one wavelet scale which corresponds to at least one feature of the object of interest;
- (c) computing wavelet coefficients at each of the least one wavelet scales;
- (d) normalizing the wavelet coefficients such that an average value of coefficients of a random pattern is a predetermined value.

8. The Method of claim 7 wherein the step of normalizing the wavelet coefficients includes the steps of:
- (d1) computing a class average value for each wavelet coefficient;
- (d2) normalizing each wavelet coefficient by its class average; and
- (d3) averaging the normalized coefficients over example images to provide a normalized average value for each coefficient.

9. The method of claim 8 wherein the step of averaging the normalized coefficients over example images includes the step of averaging the normalized coefficients over the entire set of example images.

10. The method of claim 7 further comprising the steps of:
- comparing normalized wavelet coefficient values; and
- selecting coefficient values which capture one or more significant characteristics of the object of interest.

11. The method of claim 10 wherein the step of selecting coefficient values includes the step of selecting a number of coefficients which is less than the total number of coefficients.

12. The method of claim 11 wherein the wavelet coefficients correspond to vertical, horizontal and diagonal wavelet coefficients.

13. The method of claim 10 wherein the step of selecting at least one wavelet scale which corresponds to at least one feature of the object of interest includes the step of selecting a plurality of wavelet scales, each of the wavelet scales selected to correspond to a corresponding plurality of characteristics of the object.

14. The method of claim 9 wherein the example images correspond to grey-scale example images.

* * * * *

UNITED STATES PATENT AND TRADEMARK OFFICE
CERTIFICATE OF CORRECTION

PATENT NO. : 6,421,463 B1
DATED : July 16, 2002
INVENTOR(S) : Tomaso Poggio et al.

It is certified that error appears in the above-identified patent and that said Letters Patent is hereby corrected as shown below:

Column 1,
Line 6, insert -- This invention was made with government support under Grant Numbers N00014-95-1-0600 and N00014-92-J-1879 awarded by the Navy and Grant Number ASC-9217041 awarded by the National Science Foundation. The government has certain rights in this invention. --

Column 2,
Line 11, delete "the a" and replace with -- a --.

Column 5,
Line 37, the word "Terminology" should be centered in the column.

Column 6,
Line 43, delete "on a objects" and replace with -- on objects --.

Column 7,
Line 62, delete "with the iterativly" and replace with -- interatively --.
Line 65, delete "time" and replace with -- times --.

Column 8,
Line 52, delete "In particular example" and replace with -- In a particular example --.
Line 54, delete "do not-correspond" and replace with -- do not correspond --.

Column 9,
Line 47, delete "view point" and replace with -- viewpoint --.

Column 10,
Line 34, delete "drops as impose more" and replace with -- drops as more --.

Column 13,
Line 13, delete "straight-forward" and replace with -- straightforward --.

Column 14,
Lines 35-36, delete "of the of the" and replace with -- of the --.

Column 15,
Line 54, delete "vertical$_1$" and replace with -- vertical, --.
Line 58, delete "feature" and replace with -- features --.

Column 16,
Line 19, delete "turn a" and replace with -- turn yield a --.
Line 29, delete "detailed discussed" and replace with -- discussed --.

UNITED STATES PATENT AND TRADEMARK OFFICE
CERTIFICATE OF CORRECTION

PATENT NO. : 6,421,463 B1
DATED : July 16, 2002
INVENTOR(S) : Tomaso Poggio et al.

It is certified that error appears in the above-identified patent and that said Letters Patent is hereby corrected as shown below:

Column 16, cont'd.
Line 42, delete "Illustrate" and replace with -- illustrate --.
Line 47, delete "as a example" and replace with -- as an example --.
Line 64, delete "if motion" and replace with -- of motion --.

Column 18,
Line 16, delete "pre-processor" and replace with -- preprocessor --.

Signed and Sealed this

Twenty-eighth Day of January, 2003

JAMES E. ROGAN
*Director of the United States Patent and Trademark Office*